US010397827B2

(12) United States Patent
Chung et al.

(10) Patent No.: US 10,397,827 B2
(45) Date of Patent: Aug. 27, 2019

(54) SYSTEM AND METHOD FOR MANAGING DSME NETWORK FLUCTUATION IN INDUSTRIAL WIRELESS SENSOR NETWORK

(71) Applicant: Pusan National University Industry-University Cooperation Foundation, Busan (KR)

(72) Inventors: Sanghwa Chung, Busan (KR); Yunsung Lee, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 16/199,429

(22) Filed: Nov. 26, 2018

(65) Prior Publication Data
US 2019/0182705 A1 Jun. 13, 2019

(30) Foreign Application Priority Data

Dec. 7, 2017 (KR) .................. 10-2017-0167639
Feb. 26, 2018 (KR) .................. 10-2018-0023012

(51) Int. Cl.
*H04W 28/02* (2009.01)
*H04W 74/08* (2009.01)
(Continued)

(52) U.S. Cl.
CPC ......... *H04W 28/0289* (2013.01); *H04W 4/38* (2018.02); *H04W 24/08* (2013.01);
(Continued)

(58) Field of Classification Search
CPC ......... H04W 28/0289; H04W 74/0825; H04W 24/10; H04W 72/0446; H04W 4/38; H04W 24/08; H04W 80/02
See application file for complete search history.

(56) References Cited

U.S. PATENT DOCUMENTS

2013/0094481 A1* 4/2013 Jeong ............... H04W 72/0446
370/336
2014/0133473 A1* 5/2014 Shin .................. H04W 72/0446
370/336
2015/0305023 A1* 10/2015 Jeong ..................... H04W 48/12
370/336

FOREIGN PATENT DOCUMENTS

KR 10-2012-0038361 A 4/2012

OTHER PUBLICATIONS

Korean Notice of Allowance for related KR Application No. 10-2018-0023012 dated Apr. 16, 2018 from Korean Patent Office.
(Continued)

*Primary Examiner* — Will W Lin
(74) *Attorney, Agent, or Firm* — Paratus Law Group, PLLC

(57) ABSTRACT

An apparatus for managing deterministic and synchronous multi-channel extension (DSME) network fluctuations in an industrial wireless sensor network includes: a network congestion rate measurer configured to measure a network congestion rate on the basis of a number of times an association request message is received and a number of times carrier sensing is performed, a DSME-guaranteed time slot (GTS) allocation information collector configured to continuously collect DSME-GTS allocation information using coordinators, a DSME-GTS maintenance determiner configured to determine whether to maintain or collect DSME-GTSs on the basis of collected network information, a slot reallocation determiner configured to determine whether data is received without collision from two nodes to which a slot is redundantly allocated and transmit a DSME-GTS expiration request to a sensor node for reallocation of empty slots.

7 Claims, 7 Drawing Sheets

(51) Int. Cl.
    *H04W 72/04*     (2009.01)
    *H04W 24/10*     (2009.01)
    *H04W 4/38*     (2018.01)
    *H04W 24/08*     (2009.01)
    *H04W 80/02*     (2009.01)

(52) U.S. Cl.
    CPC ....... *H04W 24/10* (2013.01); *H04W 72/0446* (2013.01); *H04W 74/0825* (2013.01); *H04W 80/02* (2013.01)

(56) References Cited

OTHER PUBLICATIONS

Youn-Sung Lee and Sang-Hwa Chung, "An Efficient Distributed Scheduling Algorithm for Mobility Support in IEEE 802.15.4e DSME-Based Industrial Wireless Sensor Networks", International Journal of Distributed Sensor Networks, Article ID 9837625, Feb. 14, 2016, pp. 1-14, vol. 2016.

* cited by examiner

FIG. 3

The number of superframes in a multi-superframe: $N = 2^{(MO-SO)}$
The number of multi-superframes in a beacon interval: $N = 2^{(BO-MO)}$
Superframe duration: $SD$ = a Base Superframe Duration* $2^{SO}$ Symbols
Multi-Superframe duration: $MD$ = a Base Superframe Duration* $2^{MO}$ Symbols
Beacon interval: $BI$ = a Base Superframe Duration* $2^{BO}$ Symbols
Example: BO = 6, SO = 3, MO = 5

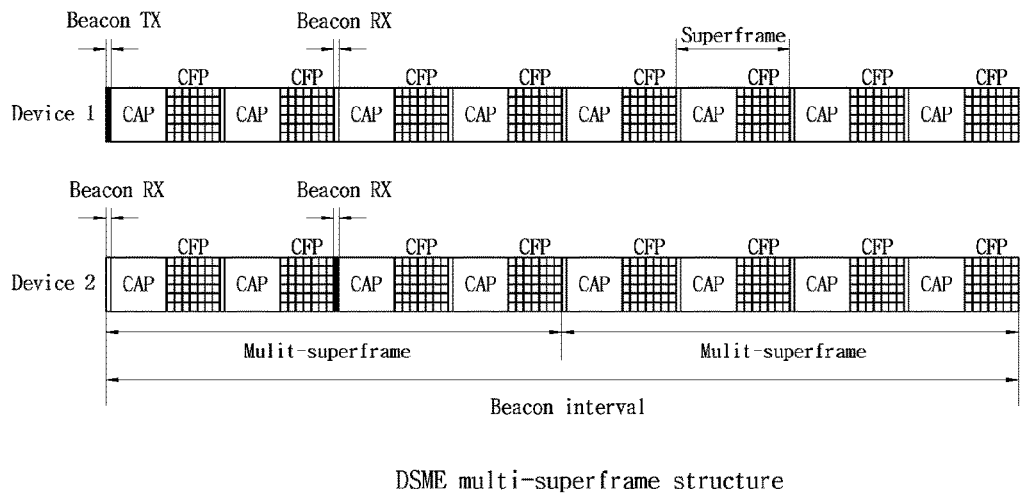

DSME multi-superframe structure

SYSTEM AND METHOD FOR MANAGING DSME NETWORK FLUCTUATION IN INDUSTRIAL WIRELESS SENSOR NETWORK

CROSS-REFERENCE TO RELATED APPLICATIONS

This application claims priority to and the benefit of Korean Patent Application Nos. 10-2017-0167639 filed on Dec. 7, 2017 and 10-2018-0023012 filed on Feb. 26, 2018, the disclosure of which are incorporated herein by reference in their entirety.

BACKGROUND

1. Field of the Invention

The present invention relates to an industrial wireless sensor network, and more particularly, to an apparatus and method for managing deterministic and synchronous multi-channel extension (DSME) network fluctuations in an industrial wireless sensor network which are capable of quickly coping with dynamic changes in the industrial wireless sensor network to reduce a network connection delay while ensuring a communication slot length.

2. Discussion of Related Art

An industrial wireless sensor network is a network formed by wirelessly connecting sensors having various purposes and is indispensable technology for establishing a ubiquitous environment.

Especially with the development of Internet-of-Things (IoT) technology, industrial wireless sensor network technology has rapidly come into widespread use and has been applied in various fields, including environmental monitoring, security and surveillance, smart grid, smart factory, etc.

In particular, a smart factory is a concept to optimize and streamline all processes, such as production, process control, repair and safety management, etc., by a factory itself by the development of information and communication technology (ICT) and sensor technology and falls within the field of IoT core application whereby all things can be connected via the Internet to exchange information or communicate between humans and the things and between the things.

Institute of Electrical and Electronics Engineers (IEEE) 802.15.4e is a standard newly proposed to wirelessly establish a smart factory infrastructure.

The IEEE 802.15.4e standard is a new transmission standard proposed to supplement IEEE 802.15.4 which is a wireless local area communication standard for the 2.4 GHz unlicensed band.

The IEEE 802.15.4e standard supports various media access control (MAC) modes, such as Deterministic and Synchronous Multi-channel Extension (DSME), Time Slotted Channel Hopping (TSCH), Low Latency (LL), a Radio-Frequency Identification (RFID) Blink mode, etc. according to the type of service. Among the various MAC modes, DSME provides various functions to secure network timeliness and transmission reliability while maintaining the superframe structure of the legacy IEEE 802.15.4 standard. DSME does not include an inactive period and is divided into a contention access period (CAP) and a contention-free period (CFP) for network management and connection, unlike the legacy IEEE 802.15.4 standard.

Accordingly, DSME can separate data communication to provide highly confident and low-latency data communication.

FIG. 1 illustrates a DSME communication method.

DSME employs a multi-superframe structure, in which a first slot of a superframe is fixed as a slot for transmitting and receiving a beacon.

In this case, a network is formed through beacon scheduling to distinguish between a beacon of a personal area network (PAN) coordinator and a beacon of a subcoordinator. A node which needs to establish communication is connected to slots of a remaining CAP via the network to communicate various messages to allocate data slots using a CSMA/CA scheme.

The node which needs to establish communication transmits a DSME-guaranteed time slot (GTS) request packet, and a coordinator receives this request and allocates the data slots to the CFP through handshaking. When the CAP ends, only a node to which slots are allocated establishes communication in the subsequent eight slots in a CFP, similar to in time division multiple access (TDMA). Reliable industrial wireless sensor network communication may be provided in this way.

However, IEEE 802.15.4e DSME MAC has the same superframe structure as the legacy 802.15.4 standard and thus is limited in terms of the number of data slots.

Accordingly, a network connection time increases and thus a delay time increases in an environment in which there are a plurality of IoT sensor nodes.

In IEEE 802.15.4e DSME, association should be performed in a front CAP of a superframe for connection to the network.

A coordinator broadcasts an enhanced beacon in a first slot of the superframe and thus each node waits at a certain channel in a listen state to receive the enhanced beacon.

A sensor node receiving a beacon transmits an association request message, and the coordinator receives the beacon, adds the sensor node to a network thereof, and transmits a response to the sensor node.

Thereafter, slots are allocated through DSME-GTS handshaking for data communication in the CFP.

This process is as illustrated in FIG. 2.

However, when there are a large number of sensor nodes to join the network in the CAP, contention through CSMA/CA may intensify, and thus random backoff slots are continuously generated, thereby causing network connection delay.

In this case, a sufficient length of a CAP or a sufficient number of slots are needed, but there are only a maximum of eight CAP slots in the superframe structure of IEEE 802.15.4e DSME, and thus the above-described problem is fundamentally difficult to solve.

Accordingly, new technology for quickly coping with dynamic changes in an industrial wireless sensor network to reduce a network connection time delay while ensuring a communication slot length is in demand.

SUMMARY

To address the above problem related to dynamic changes in an industrial wireless sensor network of the related art, the present invention is directed to a method and apparatus for managing deterministic and synchronous multi-channel extension (DSME) network fluctuations in an industrial wireless sensor network which are capable of quickly coping with dynamic changes in the industrial wireless sensor network to reduce a network connection delay while ensuring a communication slot length.

The present invention is directed to a method and apparatus for managing DSME network fluctuations in an industrial wireless sensor network which are capable of changing a superframe structure to reduce a network connection delay while ensuring a minimum communication slot length for data communication in an Institute of Electrical and Electronics Engineers (IEEE) 802.15.4e DSME network.

The present invention is directed to a method and apparatus for managing DSME network fluctuations in an industrial wireless sensor network which are capable of providing a dynamic superframe structure based on measurement of a network congestion rate to quickly cope with joining of a new network due to a dynamic change in the industrial wireless sensor network, i.e., an increase in the number of nodes or movement of nodes.

The present invention is directed to a method and apparatus for managing DSME network fluctuations in an industrial wireless sensor network which are capable of improving a network connection speed of an Internet-of-Things (IoT) sensor node by measuring a network congestion rate and changing a superframe structure without violating the legacy IEEE 802.15.4 or IEEE 802.15.4e DSME standard.

Aspects of the present invention are, however, not limited thereto and other aspects not mentioned herein will be apparent to those of ordinary skill in the art from the following description.

According to an aspect of the present invention, an apparatus for managing DSME network fluctuations in an industrial wireless sensor network includes a network congestion rate measurer configured to measure a network congestion rate on the basis of a number of times an association request message is received and a number of times carrier sensing is performed, a DSME-guaranteed time slot (GTS) allocation information collector configured to continuously collect DSME-GTS allocation information using coordinators, a DSME-GTS maintenance determiner configured to determine whether to maintain or collect DSME-GTSs on the basis of collected network information, a slot reallocation determiner configured to determine whether data is received without collision from two nodes to which a slot is redundantly allocated and transmit a DSME-GTS expiration request to a sensor node for reallocation of empty slots, and a synchronization transmitter configured to synchronize a personal area network (PAN) coordinator and the coordinators with each other even in DSME by applying time slot relaying-based beacon synchronization to DSME and transmitting a beacon in a slot of a subsequent superframe excluding a first slot of a multi-superframe in which an enhanced beacon is transmitted.

Here, if seven slots remain in one contention access period (CAP), a dynamic superframe is executed when a ratio between a total number of control messages and a total number of association request messages is greater than 0.7 based on the network congestion rate measured by the network congestion rate measurer.

When it is determined that a number of times the association request message is transmitted in the CAP is five or more, the number of superframes may be increased proactively.

The execution of the dynamic superframe may include applying a dynamic superframe changing a multi-superframe structure of IEEE 802.15.4e DSME according to a network situation. The multi-superframe structure of IEEE 802.15.4e DSME may be determined by three values of macBeaconOrder BO, macSuperframeOrder SO, and macMultisuperframeOrder MO, wherein MO represents a length of the multi-superframe, and SO represents a parameter for determining a length of a superframe.

$0 \leq SO \leq BO \leq 14$, and $SD=\text{aBaseSuperframeDuration} \times 2^{SO}$ symbol. In this case, the number of superframes in one beacon interval may be determined by the number of MOs and thus actually $0 \leq SO \leq MO \leq BO \leq 14$.

For scheduling to which the dynamic superframe is applied, when superframes of the PAN coordinator and the coordinators are determined in advance, whether a schedule is to be changed or not may be determined by the number of slots to be reduced during allocation of slots, a currently allocated schedule, and a queue length of each of the coordinators. When BO, SO, and MO are reduced or increased, a total superframe duration may increase or decrease and thus a data slot size may change.

According to another aspect of the present invention, a method of managing DSME network fluctuations in an industrial wireless sensor network includes measuring a network congestion rate on the basis of a number of times an association request message is received and a number of times carrier sensing is performed, continuously collecting DSME-guaranteed time slot (GTS) allocation information using coordinators, determining whether to maintain DSME-GTSs by determining whether to maintain or collect DSME-GTSs on the basis of collected network information; determining whether to reallocate slots by checking whether data is received without collision from two nodes to which a slot is redundantly allocated and transmitting a DSME-GTS expiration request to a sensor node for reallocation of empty slots, and synchronizing a PAN coordinator and the coordinators with each other even in DSME by applying time slot relaying-based beacon synchronization to DSME and transmitting a beacon in a slot of a subsequent superframe excluding a first slot of a multi-superframe in which an enhanced beacon is transmitted.

If seven slots remain in one contention access period (CAP), a dynamic superframe may be executed when a ratio between a total number of control messages and a total number of association request messages is greater than 0.7 based on the network congestion rate measured during the measuring of the network congestion rate.

When it is determined that a number of times the association request message is transmitted in the CAP is five or more, the number of superframes may be increased proactively.

The execution of the dynamic superframe may include applying a dynamic superframe changing a multi-superframe structure of IEEE 802.15.4e DSME according to a network situation. The multi-superframe structure of IEEE 802.15.4e DSME may be determined by three values of macBeaconOrder BO, macSuperframeOrder SO, and macMultisuperframeOrder MO, wherein MO represents a length of the multi-superframe, and SO represents a parameter for determining a length of a superframe.

$0 \leq SO \leq BO \leq 14$, and $SD=\text{aBaseSuperframeDuration} \times 2^{SO}$ symbol. In this case, the number of superframes in one beacon interval may be determined by the number of MOs and thus actually $0 \leq SO \leq MO \leq BO \leq 14$.

For scheduling to which the dynamic superframe is applied, when superframes of the PAN coordinator and the coordinators are determined in advance, whether a schedule is to be changed or not may be determined by the number of slots to be reduced during allocation of slots, a currently allocated schedule, and a queue length of each of the coordinators. When BO, SO, and MO are reduced or increased, a total superframe duration may increase or decrease and thus a data slot size may change.

Determining whether to execute the dynamic superframe may include setting the enhanced beacon by setting the macBeaconOrder BO, the macSuperframeOrder SO, and the macMultisuperframeOrder MO which are information regarding the superframes of the PAN coordinator and the coordinators; broadcasting the enhanced beacon by starting the CAP and receiving the association request message; checking whether the ratio between the total number of control messages and the total number of association request messages is greater than or equal to 0.7 and maintaining a current superframe when the ratio is greater than or equal to 0.7 and expanding the superframe by changing the macBeaconOrder BO, the macSuperframeOrder SO, and the macMultisuperframeOrder MO when the ratio is not greater than or equal to 0.7; and checking whether the ratio between the total number of control messages and the total number of association request messages is less than or equal to 0.3 or whether a channel usage rate is less than or equal to 0.4, and maintaining the current superframe when the ratio is not less than or equal to 0.3 or when the channel usage rate is not less than or equal to 0.4 and contracting the current superframe by changing the macBeaconOrder BO, the macSuperframeOrder SO, and the macMultisuperframeOrder MO when the ratio is less than or equal to 0.3 or when the channel usage rate is less than or equal to 0.4.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is a diagram illustrating a multi-superframe structure of IEEE 802.15.4e DSME;

DETAILED DESCRIPTION

Hereinafter, exemplary embodiments of a method and apparatus for managing deterministic and synchronous multi-channel extension (DSME) network fluctuations in an industrial wireless sensor network according to the present invention will be described in detail.

Features and advantages of the method and apparatus for managing DSME network fluctuations in an industrial wireless sensor network according to the present invention will be clearly understood from the following detailed description of embodiments thereof.

Figure 4:
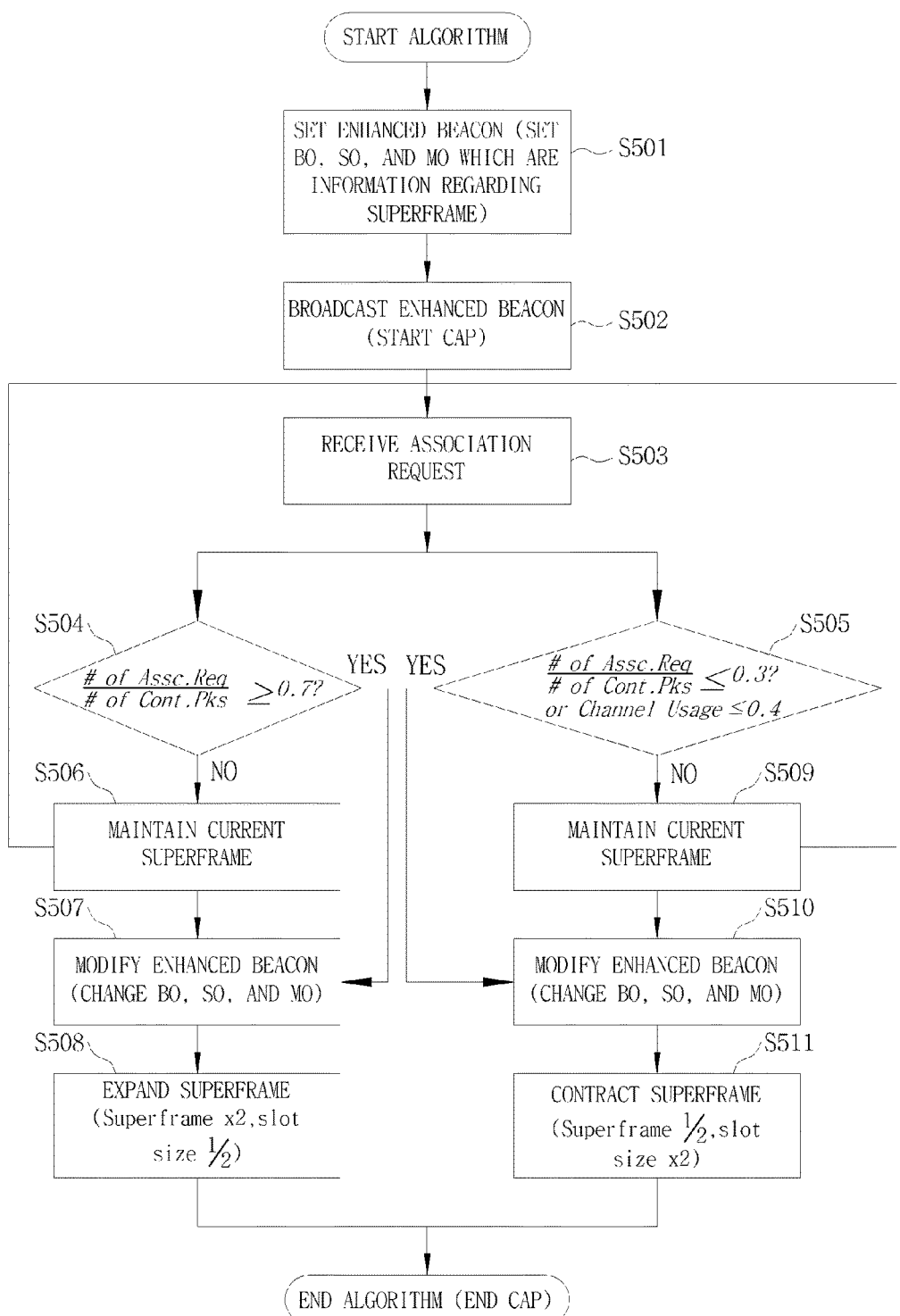
FIG. 4 is a flowchart of a scheduling process to which a dynamic superframe of IEEE 802.15.4e DSME is applied for management of DSME network fluctuations according to an embodiment of the present invention.

FIG. 3 is a diagram illustrating a multi-superframe structure of Institute of Electrical and Electronics Engineers (IEEE) 802.15.4e DSME. FIG. 4 is a flowchart of a scheduling process to which a dynamic superframe of IEEE 802.15.4e DSME is applied for management of DSME network fluctuations according to an embodiment of the present invention.

The present invention is directed to a method of changing a superframe structure to reduce a network connection delay while ensuring a minimum communication slot length for data communication in an IEEE 802.15.4e DSME network, in which the superframe structure based on measurement of a network congestion rate is defined below to quickly cope with joining of a new network due to a dynamic change in an industrial wireless sensor network, i.e., an increase in the number of nodes or movement of nodes.

The present invention is directed to improving a network connection speed of an Internet-of-Things (IoT) sensor node by measuring a network congestion rate and changing a superframe structure without violating the legacy IEEE 802.15.4 or IEEE 802.15.4e DSME standard.

The present invention includes synchronizing a personal area network (PAN) coordinator and a coordinator even in DSME by applying time slot relaying-based beacon synchronization to IEEE 802.15.4e DSME and transmitting a beacon in a slot of a subsequent superframe excluding a first slot of a multi-superframe in which an enhanced beacon is transmitted.

Figure 1:
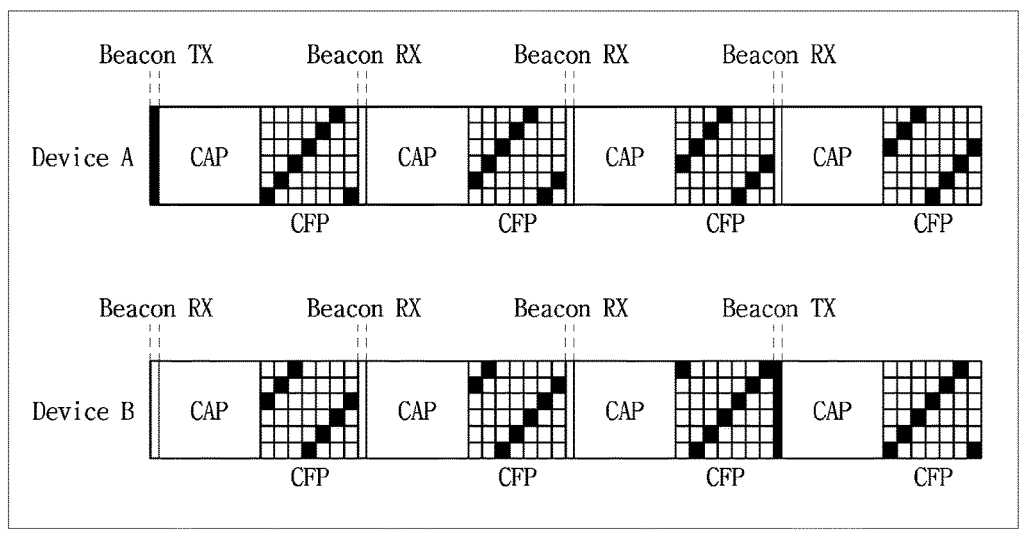
FIG. 1 is a diagram illustrating a deterministic and synchronous multi-channel extension (DSME) communication method according to the Institute of Electrical and Electronics Engineers (IEEE) 802.15.4e standard.
Figure 2:
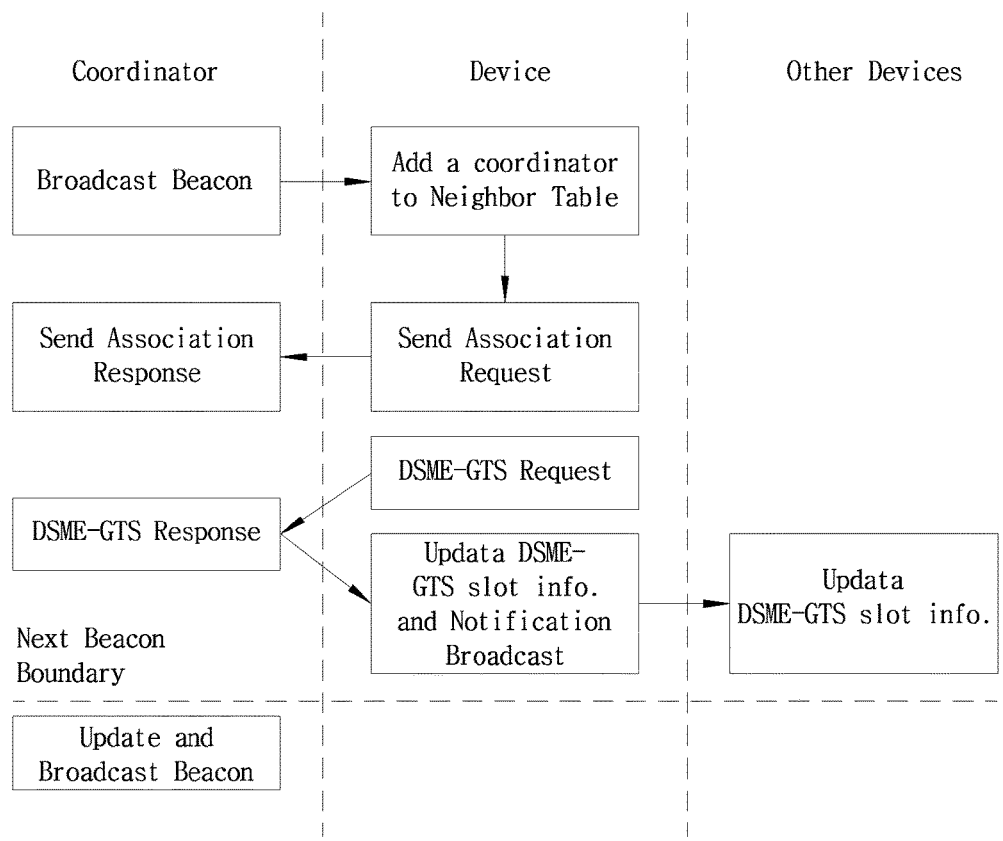
FIG. 2 is a diagram illustrating IEEE 802.15.4e DSME guaranteed time slot (GTS)-handshaking.

As illustrated in FIG. 2, a sensor node waits at a specific or random channel to receive the enhanced beacon so as to connect to a network. In this case, when a large number of nodes transmit an association request, contention occurs due to a CSMA/CA mechanism.

Transmitting a CCA for collision avoidance is referred to as carrier sensing. In this case, attempting communication again after up to three random backoff slots when a medium is in use is the CSMA/CA mechanism according to the IEEE 802.15.4 standard.

When random backoff repeatedly occurs while attempting communication, communication is tried again when a next superframe starts after a CAP ends, and thus a network connection delay occurs.

Especially when a channel via which a coordinator sends an enhanced beacon continuously changes, the sensor node keeps waiting until it receives the beacon again and thus a delay increases to a next boundary at which a beacon interval starts.

To avoid such a problem, a method of fixing a specific channel as a control channel is used in the legacy 802.15.4 standard. However, in this case, it is difficult to accommodate a number of slots which is greater than an uppermost limit. That is, it is necessary to increase a CAP.

A core structure of the present invention is that communication is established using a superframe structure defined as default and the superframe structure is changed when a network congestion rate exceeds a threshold.

As illustrated in FIG. 3, a multi-superframe structure of IEEE 802.15.4e DSME is determined by three values, i.e., macBeaconOrder BO, macSuperframeOrder SO, and macMultisuperframeOrder MO. The three values will be referred herein to as BO, SO, and MO.

MO represents the length of a multi-superframe. SO represents a parameter for determining the length of a superframe.

Here, $0 \leq SO \leq BO \leq 14$, and $SD = \text{aBaseSuperframeDuration} \times 2^{SO}$ symbol.

In this case, the number of superframes in one beacon interval is determined by the number of MOs, and thus, actually, $0 \leq SO \leq MO \leq BO \leq 14$.

FIG. 3 illustrates a formula for calculating the size of a multi-superframe according to the IEEE 802.15.4e standard.

When BO=6, SO=3, and MO=5, the number of multi-superframes is four and the number of multi-superframes in one beacon interval is two.

Since the size of one symbol is fixed, the length of one slot and the length of a superframe may be calculated using the size of one symbol.

One beacon interval is configured as described above. A beacon collision should be considered when, in a star or tree topology, a plurality of coordinators are included in one PAN coordinator as illustrated in FIG. 3.

Therefore, when a beacon is transmitted in first slots of all superframes, an order in which the beacon is transmitted should be determined in a way agreed between the coordinators. In conclusion, a sensor node which needs to newly join one coordinator should maintain a listen state to receive a beacon from the coordinator thereof, and thus, an opportunity to join a network may be obtained more quickly when beacon intervals are short.

A dynamic superframe technique will be described below.

The present invention employs the dynamic superframe technique for changing a multi-superframe structure of IEEE 802.15.4e DSME according to a network situation.

A total number of factors that determine a superframe is three.

The number of superframes to be included in a beacon interval is determined by three factors, i.e., BO, SO, and MO. A multi-superframe should be determined in advance according to the number of coordinators to be subordinate to a PAN coordinator in a topology.

In this case, a whole default superframe structure can be determined when a number of times of transmitting a beacon from one coordinator in one beacon interval is determined.

Furthermore, whether a dynamic superframe can be simultaneously applicable as soon as a network situation changes are very important. In IEEE 802.15.4e DSME, when a PAN coordinator changes an enhanced beacon, a first slot in which a subsequent beacon interval starts is used and thus the enhanced beacon is not immediately changed but is changed after the duration of several superframes.

FIG. 4 illustrates a scheduling process to which a dynamic superframe is applied. When superframes of a PAN coordinator and coordinators are determined in advance, whether a schedule is to be changed or not is determined on the basis of the number of slots to be reduced during allocation of slots, a currently allocated schedule, and a queue length of each coordinator.

In this case, when the factors BO, SO, and MO are increased or reduced, a total superframe duration increases or decreases and thus a data slot size changes.

A method of measuring a network congestion rate will be described below.

A point of time when a multi-superframe structure of IEEE 802.15.4e DSME is to be changed is a factor very important to changing the multi-superframe structure.

This is because a desired data transmission efficiency of a contention-free period (CFP) decreases when the length and number of data slots are changed blindly. That is, when the length of data slots is reduced and more superframes are pushed into the beacon interval, a delay time in the CAP may be reduced but the number of idle slots in the CFP increases, and thus total network efficiency decreases.

In contrast, when the length of data slots is increased and the number of superframes is reduced, data transmission reliability may increase but a required bandwidth may not be sufficiently secured, thereby reducing data transmission efficiency.

Accordingly, it is necessary to execute a dynamic superframe according to a network congestion rate.

FIG. 4 illustrates that a channel busy degree is determined by a local queue length of each coordinator but there is one more factor to consider.

The channel busy degree indicates that actually, slots should be additionally allocated due to shortage of idle slots of the CFP or for communication, but an increase in a queue length may be understood to mean that the number of requests to establish data communication from sensor nodes increases and should not be understood to mean that the number of nodes joining a network, i.e., a total number of nodes, increases or decreases.

Accordingly, factors to consider include a number of times an association request message is received and a number of times carrier sensing is performed.

These factors may be measured at a media access control (MAC) layer and are the most reliable factors to estimate the number of sensor nodes which need to communicate with a current coordinator.

In the present invention, whether a current frame is a dynamic superframe is determined by these factors while various scenarios are experimentally conducted in a Qualnet simulation environment.

In the scheduling process to which a dynamic superframe is applied, an enhanced beacon is set (S501), in which information regarding superframes of a PAN coordinator and coordinators, e.g., the macBeaconOrder BO, the macSuperframeOrder SO, and the macMultisuperframeOrder MO, are set as illustrated in FIG. 4

The enhanced beacon is broadcast by starting a CAP (S502), and an association request message is received (S503).

Whether a ratio between a total number of control messages and a total number of association request messages is greater than or equal to 0.7 is determined (S504). When it is determined that the ratio is not greater than or equal to 0.7, a current superframe is maintained (S506). When it is determined that the ratio is greater than or equal to 0.7, the superframe is expanded (S508) by changing the macBeaconOrder BO, the macSuperframeOrder SO, and the macMultisuperframeOrder MO (S507).

Whether the ratio between the total number of control messages and the total number of association request messages is less than or equal to 0.3 or whether a channel usage ratio is less than or equal to 0.4 is determined (S505). When it is determined that the ratio is not less than or equal to 0.3 or when the channel usage ratio is not less than or equal to 0.4, the current superframe is maintained (S509). When it is determined that the ratio is less than or equal to 0.3 or when the channel usage ratio is less than or equal to 0.4, the superframe is contracted (S511) by changing the macBeaconOrder BO, the macSuperframeOrder SO, and the macMultisuperframeOrder MO (S510).

A best result was obtained through execution of a dynamic superframe in a scenario where the number of nodes was gradually increased when seven slots remained in one CAP and when the ratio between the total number of control messages and the total number of association request messages was greater than 0.7.

That is, when it determined that a number of times the association request message was transmitted in the CAP was five or more, a network join delay time increased very sharply unless the number of superframes was increased proactively.

Figure 5A:
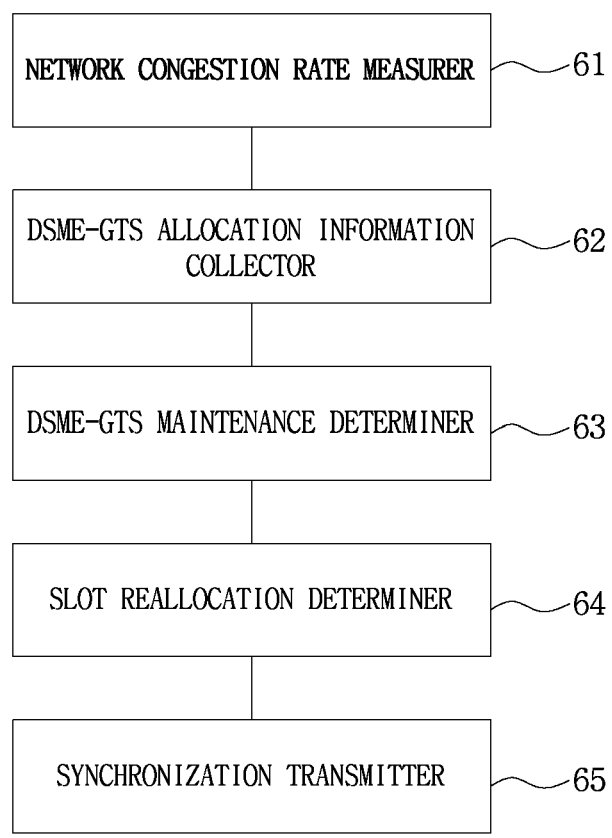
FIG. 5A is a block diagram of an apparatus for managing DSME network fluctuation in an industrial wireless sensor network according to an embodiment of the present invention.
Figure 5B:
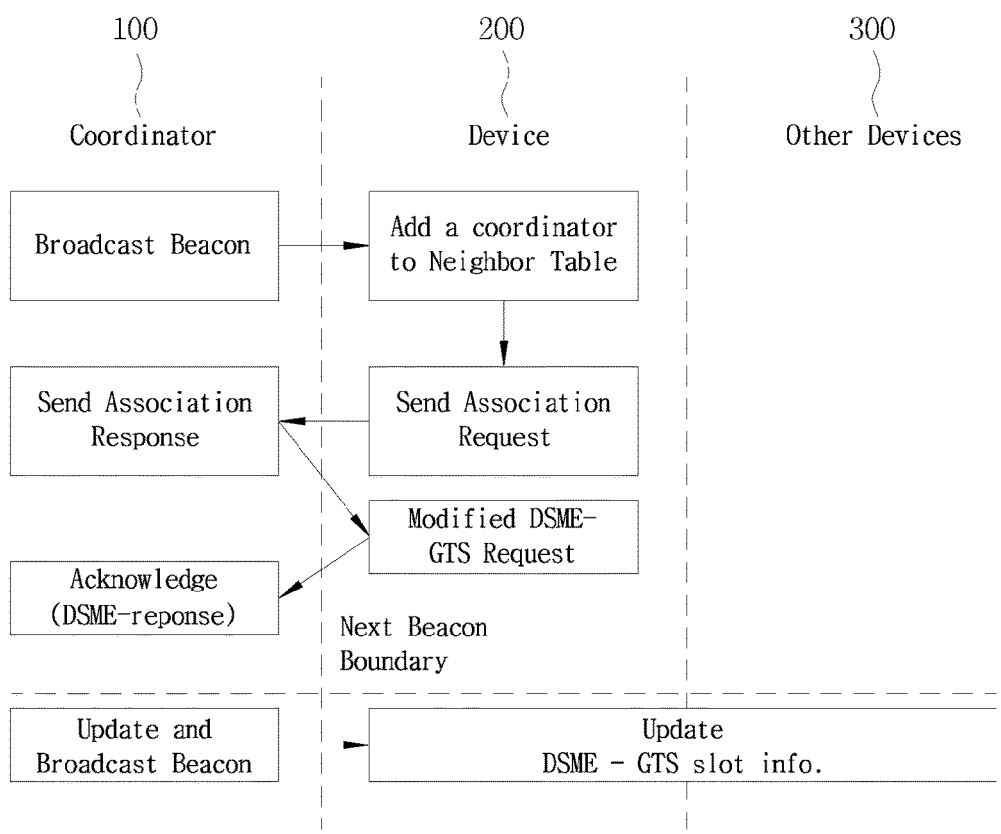
FIG. 5B is a diagram illustrating a process of simplifying DSME-GTS allocation.

FIG. 5A is a block diagram of an apparatus for managing DSME network fluctuation in an industrial wireless sensor network according to an embodiment of the present invention. FIG. 5B is a diagram illustrating a process of simplifying DSME-guaranteed time slot (GTS) allocation.

As illustrated in FIG. 5A, the apparatus for managing DSME network fluctuations in the industrial wireless sensor network consisting of a coordinator 100, a sensor node 200, and neighboring sensor nodes 300 according to an embodiment of the present invention includes a network congestion rate measurer 61 which measures a network congestion rate on the basis of a number of times an association request message is received and a number of times carrier sensing is performed to estimate the number of sensor nodes which need to communicate with a current coordinator, a DSME-GTS allocation information collector 62 which continuously collects DSME-GTS allocation information using coordinators from each node through data communication so as to adjust the size of a multi-superframe when the number of nodes to which DSME-GTSs are allocated becomes substantially the same as the number of all available slots, a DSME-GTS maintenance determiner 63 which determines whether to maintain or collect the DSME-GTSs on the basis of collected network information such as link quality, etc., a slot reallocation determiner 64 which determines whether data is received without collision from two nodes to which a slot is redundantly allocated and transmits a DSME-GTS expiration request to a sensor node for reallocation of empty slots when collection efficiency deteriorates due to low link quality, and a synchronization transmitter 65 which synchronizes a PAN coordinator and the coordinators with each other even in the DSME by applying time slot relaying-based beacon synchronization to IEEE 802.15.4e DSME and transmits a beacon in a slot of a subsequent superframe excluding a first slot of the multi-superframe in which an enhanced beacon is transmitted.

A DSME network fluctuation management method employed by the apparatus for managing DSME network fluctuations in the industrial wireless sensor network having the above configuration according to the present invention includes the following operations.

First, the DSME network fluctuation management method includes measuring a network congestion rate on the basis of a number of times an association request message is received and a number of times carrier sensing is performed to estimate the number of sensor nodes which need to communicate with a current coordinator, continuously collecting DSME-GTS allocation information using coordinators from each node through data communication so as to adjust the size of a multi-superframe when the number of nodes to which DSME-GTSs are allocated becomes substantially the same as the number of all available slots, determining whether to maintain or collect the DSME-GTSs on the basis of collected network information such as link quality, etc., determining whether data is received without collision from two nodes to which a slot is redundantly allocated and transmitting a DSME-GTS expiration request to a sensor node for reallocation of empty slots when collection efficiency deteriorates due to low link quality, and synchronizing a PAN coordinator and the coordinators with each other even in the DSME by applying time slot relaying-based beacon synchronization to IEEE 802.15.4e DSME and transmitting a beacon in a slot of a subsequent superframe excluding a first slot of the multi-superframe in which the enhanced beacon is transmitted.

A DSME-GTS management method will be described in detail below.

When the number of nodes to which the DSME-GTSs are allocated becomes substantially the same as the number of all available slots, the size of the multi-superframe may be adjusted and thus the DSME-GTS allocation information may be continuously collected by the coordinators from each node through data communication.

The coordinators may determine whether to maintain or collect the DSME-GTSs on the basis of the collected network information such as link quality, etc.

Furthermore, whether data is received without collision from two nodes to which a slot is redundantly allocated is determined, and a DSME-GTS expiration request is transmitted to a sensor node for reallocation of empty slots when collection efficiency deteriorates due to low link quality.

FIG. 5B illustrates DSME-GTS performed to allocate data slots to a DSME CFP, the DSME-GTS being performed within a CAP.

Frame relaying performed for synchronization will be described below.

A wireless sensor network according to the present invention is based on IEEE 802.15.4e DSME MAC and thus an enhanced beacon is received from a PAN coordinator for synchronization of a whole network.

To this end, time slot relaying-based beacon synchronization is performed.

In the time slot relaying-based beacon synchronization, a frame is relayed between the PAN coordinator and a sensor node in a vertical direction. In the case of outward relaying, a delay time is a superframe duration macSyncRelayingOffset.

In the case of inward relaying, a delay time is a superframe duration [2(BO−SO)−macSyncRelayingOffset]. This method applies to IEEE 802.15.4e DSME, since DSME network topology is of star or tree type and thus the size of a superframe for each coordinator may vary when the number of nodes is increased.

In this case, unless the enhanced beacon is updated with information regarding the multi-superframe by ultimately transmitting information regarding each superframe to the PAN coordinator, network synchronization may collapse, thereby causing collision to occur or preventing collection of data.

In the present invention, the PAN coordinator and the coordinators are synchronized with each other even in DSME by applying time slot relaying-based beacon synchronization to IEEE 802.15.4e DSME, and a beacon is transmitted in a slot of a subsequent superframe excluding a first slot of the multi-superframe in which the enhanced beacon is transmitted.

Figure 6:
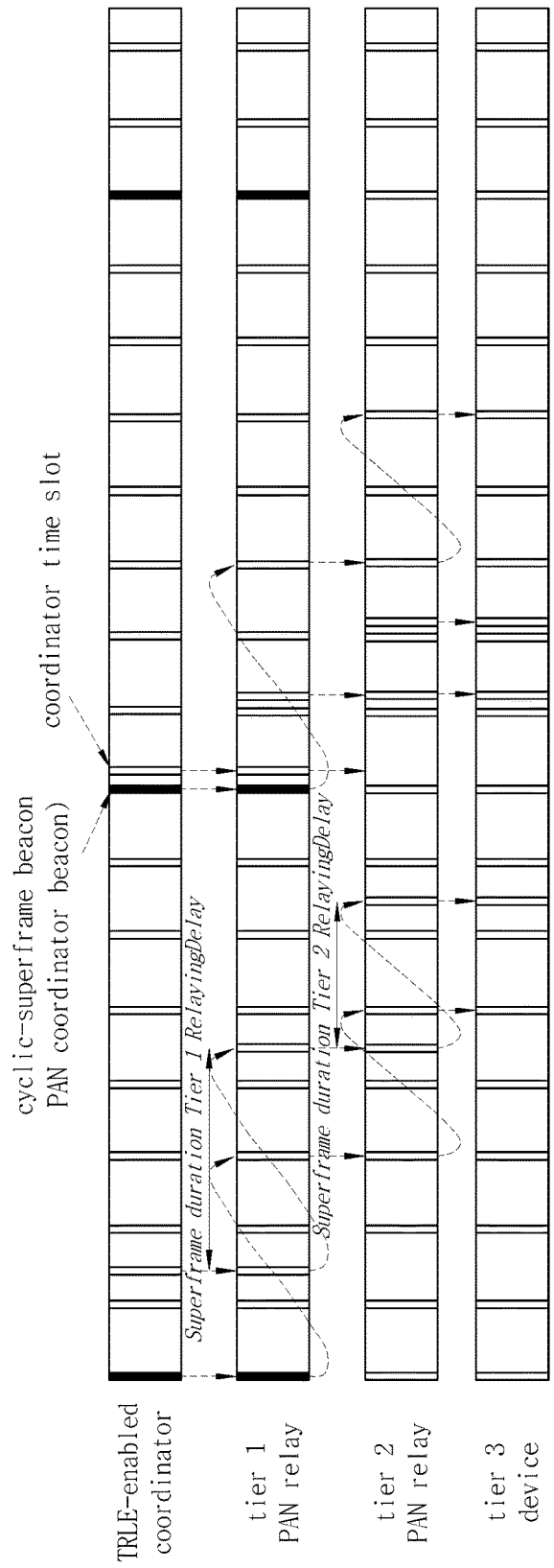
FIG. 6 is a diagram illustrating a beacon relaying method using time slot relay-based link extension media access control (MAC).

FIG. 6 is a diagram illustrating a beacon relaying method using time slot relay-based link extension MAC.

Synchronization should be accurately implemented to apply a method according to the present invention.

Unlike foreign industrial wireless sensor network technology, a separate synchronization server or network manager server is not necessary and thus it is important to synchronize an enhanced beacon of a PAN coordinator and a beacon of a sub-coordinator with each other to configure an IEEE 802.15.4e DSME network. For the synchronization of the beacons, it is necessary to determine the position of a coordinator in advance in consideration of an optimal network configuration when a smart factory intra-network is constructed. In this regard, an enhanced beacon may be relayed by referring to the time slot relay-based link extension MAC Telecommunications Technology Association (TTA) standard established in 2013.

FIG. 6 illustrates a method of synchronizing beacons of a PAN coordinator and a coordinator with each other through time slot relay-based link extension MAC and transmitting the beacons to a sub-network.

In a smart factory, various sensor nodes and measuring equipment are connected in a complicated manner, and a sensor node should be capable of being moved or modified to optimize a process.

In the apparatus and method for managing DSME network fluctuations in the industrial wireless sensor network described above, a dynamic superframe structure based on measurement of a network congestion rate is provided to quickly cope with the joining of a new network due to dynamic changes in the industrial wireless sensor network, i.e., an increase in the number of nodes or movement of the nodes, to improve the network connection speed of an IoT sensor node by changing the structure of a superframe by measuring the network congestion rate without violating the legacy IEEE 802.15.4 or IEEE 802.15.4e DSME standard.

The apparatus and method for managing DSME network fluctuations in the industrial wireless sensor network described above have the following advantages.

First, dynamic changes in the industrial wireless sensor network can be quickly coped with to reduce a network connection delay while ensuring a communication slot length.

Second, the number of superframes can be adjusted without modifying a MAC standard by providing a dynamic superframe structure based on a network congestion rate, and a network join delay can be improved by adjusting a data slot length. Thus, the present invention is easily applicable to a large-scale IoT sensor network environment.

Thirdly, network management is not performed by a separate device but is performed in a distributed manner on the basis of network information modified using coordinators and a PAN coordinator, thereby constructing a reliable industrial wireless sensor network at low costs.

Fourthly, an IEEE 802.15.4e DSME MAC-based smart factory can be constructed and commercialized.

As described above, it will be understood that the present invention may be embodied in many different forms without departing from essential features thereof.

Accordingly, the embodiments set forth herein should be considered in descriptive sense only and not for purposes of limitation. The scope of the present invention is defined not by the above description but by the appended claims, and all differences within the scope will be construed as being included in the present invention.

What is claimed is:

1. A method of managing deterministic and synchronous multi-channel extension (DSME) network fluctuations in an industrial wireless sensor network, the method comprising:
   measuring a network congestion rate on the basis of a number of times an association request message is received and a number of times carrier sensing is performed;
   continuously collecting DSME-guaranteed time slot (GTS) allocation information using coordinators;
   determining whether to maintain DSME-GTSs by determining whether to maintain or collect DSME-GTSs on the basis of collected network information;
   determining whether to reallocate slots by checking whether data is received without collision from two nodes to which a slot is redundantly allocated and transmitting a DSME-GTS expiration request to a sensor node for reallocation of empty slots; and
   synchronizing a personal area network (PAN) coordinator and the coordinators with each other even in DSME by applying time slot relaying-based beacon synchronization to DSME and transmitting a beacon in a slot of a subsequent superframe excluding a first slot of a multi-superframe in which an enhanced beacon is transmitted.

2. The method of claim 1, wherein if seven slots remain in one contention access period (CAP), a dynamic superframe is executed when a ratio between a total number of control messages and a total number of association request messages is greater than 0.7 based on the network congestion rate measured during the measuring of the network congestion rate.

3. The method of claim 2, wherein, when it is determined that a number of times the association request message is transmitted in the CAP is five or more, the number of superframes is increased proactively.

4. The method of claim 2, wherein the execution of the dynamic superframe comprises applying a dynamic superframe changing a multi-superframe structure of IEEE 802.15.4e DSME according to a network situation,
   wherein the multi-superframe structure of IEEE 802.15.4e DSME is determined by three values of macBeaconOrder BO, macSuperframeOrder SO, and macMultisuperframeOrder MO,
   wherein MO represents a length of the multi-superframe, and SO represents a parameter for determining a length of a superframe.

5. The method of claim 4, wherein $0 \leq SO \leq BO \leq 14$, and $SD = aBaseSuperframeDuration \times 2^{SO}$ symbol,
   wherein the number of superframes in one beacon interval is determined by the number of MOs and thus actually $0 \leq SO \leq MO \leq BO \leq 14$.

6. The method of claim 4, wherein, for scheduling to which the dynamic superframe is applied, when superframes of the PAN coordinator and the coordinators are determined in advance, whether a schedule is to be changed or not is determined by the number of slots to be reduced during allocation of slots, a currently allocated schedule, and a queue length of each of the coordinators, and
   when BO, SO, and MO are reduced or increased, a total superframe duration increases or decreases and thus a data slot size changes.

7. The method of claim 4, wherein determining whether to execute the dynamic superframe comprises:
   setting the enhanced beacon by setting the macBeaconOrder BO, the macSuperframeOrder SO, and the macMultisuperframeOrder MO which are information regarding the superframes of the PAN coordinator and the coordinators;
   broadcasting the enhanced beacon by starting the CAP and receiving the association request message;
   checking whether the ratio between the total number of control messages and the total number of association request messages is greater than or equal to 0.7 and maintaining a current superframe when the ratio is greater than or equal to 0.7 and expanding the superframe by changing the macBeaconOrder BO, the macSuperframeOrder SO, and the macMultisuperframeOrder MO when the ratio is not greater than or equal to 0.7; and
   checking whether the ratio between the total number of control messages and the total number of association request messages is less than or equal to 0.3 or whether a channel usage rate is less than or equal to 0.4, and maintaining the current superframe when the ratio is not less than or equal to 0.3 or when the channel usage rate is not less than or equal to 0.4 and contracting the current superframe by changing the macBeaconOrder BO, the macSuperframeOrder SO, and the macMultisuperframeOrder MO when the ratio is less than or equal to 0.3 or when the channel usage rate is less than or equal to 0.4.

* * * * *